United States Patent Office 3,585,047
Patented June 15, 1971

3,585,047
ENZYMATIC IMPROVEMENT OF SOYBEAN FLAVOR AND STABILITY
Masao Fujimaki, Hiromichi Kato, Soichi Arai, and Michiko Yamashita, Tokyo, Japan, assignors to the United States of America as represented by the Secretary of Agriculture
No Drawing. Filed Oct. 30, 1968, Ser. No. 772,039
Int. Cl. A23l 1/20
U.S. Cl. 99—98                    1 Claim

ABSTRACT OF THE DISCLOSURE

Incubation of soybeam curd or defatted soybean flour with certain highly specific proteolytic enzymes liberates extraction-resistant beany and astringent flavor constituents and reversion-sensitive lipid materials from their apparent extremely close association with the proteinaceous constituents. The removal of the enzymatically liberated objectionable taste and oxidation susceptible constituents by washing with aqueous ethanol then provides stabilized soybean materials having little if any astringent and beany flavor and a distinctly diminished tendency to flavor reversion.

---

A nonexclusive, irrevocable, royalty-free license in the invention herein described, throughout the world for all purposes of the United States Government, with the power to grant sublicenses for such purposes, is hereby granted to the Government of the United States of America.

FIELD OF THE INVENTION

This invention pertains to a process for improving the flavor and taste of soybean curd or defatted soybean flour. More particularly this invention pertains to an enzymatic process for substantially eliminating the highly objectionable astringent and beany flavors that are sensed upon the ingestion of raw soybeans, and which, though markedly lessened by cooking or toasting, still are still strong enough to limit consumption of the soybean material unless masked by extensive admixture with bland additives that then limit the protein value of the foodstuff. Still more particularly this invention relates to a process whereby soybean curd or defatted soy bean flour is subjected in aqueous suspension to selective action of one or more specific proteolytic enzymes that liberate or degrade much of the poorly defined objectionable taste constituents and also liberate tightly bound lipid components that cause flavor reversion, and then washing from the still essentially intact soybean protein the thusly liberated or degraded grassy or beany as well as the reversion-sensitive components by extracting with 50 percent aqueous ethanol.

DESCRIPTION OF THE PRIOR ART

The presently vast cultivation of soybeans in the United States is due more to its content of edible oil than to its protein, which in the raw state has an astringently beany taste that largely prevents its food use for humans unless converted by fermentation to such Japanese foods as miso, shoyu (soy sauce), or tofu, or unless the above tastes or flavors are substantially attenuated by toasting or cooking the hexane-extracted soybean meal, in either case of which the still rather unpalatable soy protein has become completely denatured and insoluble and cannot be satisfactorily used as a substitute for sodium caseinate, particularly in vanilla ice cream or in the synthetic milks where an utterly bland flavor would be absolutely essential.

Many distinct proteolytic enzymes are commercially available. Papain and bromelin, both of plant origin, are widely used for tenderizing meat. Pepsin and trypsin are powerful, nonspecific proteolytic enzymes of animal origin that are used clinically for replacement therapy and in fundamental protein research. Lastly, there are a number of microbiologically produced proteases that are used for the preparation of protein hydrolysates and amino acids and for sophisticated research in the fields of enzymology, medicine, protein chemistry, microbiology, and foods. However, to our knowledge, none of these proteases including "Molsin," the proprietary name of Seishin Seiyaku Company (Japan) for its brand of aspergillopeptidase-A from cultures of *Aspergillus saitoi*, and "C-Pase," Sigma Chemical Company's proprietary name for the carboxypeptidase-A obtained from bovine pancreas, or "Takadiastase-SS," from culture of *Aspergillus oryzae* have heretofore been employed on soybean protein either for analytical purposes or for flavor improvement.

The instant invention wherein we subject hexane-defatted soy flour or soy curd to 2–6 hours of selective digestion by a microbial protease selected from the group consisting of the acidic aspergillopeptidase-A produced by *Aspergillus saitoi*, the neutral protease produced by *Aspergillus oryzae*, and the alkaline protease produced by *Bacillus subtilis*, or the carboxypeptidase-A isolated from bovine pancreas, and removing the thereby liberated or degraded astringent and beany principles and the also liberated hexanol, hexanal, saponin, and reversion-susceptible bound lipids by then extracting with highly aqueous ethanol, is the outgrowth of our slightly preceding discoveries that the free amino acids and particularly the peptides liberated from soy protein by extensive hydrolysis with pepsin comprise significant amounts of leucine, isoleucine, phenylalanine, and valine, which specific amino acids per se are known to have a bitter flavor, which bitterness we also found to be even more intense in the therewith concurrently formed or liberated diffusible peptides, analysis of which showed the C- or N-terminals thereof to be mostly composed of leucine, the specific amino acid sequences of the seven arbitrarily designated constituent peptides being set forth in Table I. These fiindings, incidentally, are not inconsistent with the several literature reports that bitter peptides have been isolated following tryptic or bacterial enzyme hydrolysis of different dairy products including cheese, casein, and defatted milk solids.

However, the bitter amino acids and the still more intensely bitter peptides characterized in Table I are not per se germane to the present invention other than for indicating the background research and for showing the unobviousness of the operative enzymes of our invention in view of the fact that we have found that most proteolytic enzymes actually produce a distinctly bitter taste, apparently by promoting the formation of the bitter peptides.

TABLE I

| Peptide: | Amino acid sequence |
|---|---|
| A–1 | H·Gly-Leu·OH |
| A–2 | H·Leu-Phe·OH |
| B–1 | H·Leu-Lys·OH |
| C–1 | H·Ser-Lys-Gly-Leu·OH |
| D–1 | H·Phe-(Ile, Leu$_2$)-Gln-Gly-Val·OH |
| D–2 | H·Arg-Leu-Leu·OH |
| D–3 | H·Arg-Leu·OH |

SUMMARY

In view of our elucidation of the bitter and beany (astringent) factors increasingly liberated from soybean protein during up to 24 hours of peptic hydrolysis, the primary object of the instant invention is the provision of an enzymatic process for removing the objectionable flavor components in preferably defatted soybean protein by preferentially and selectively freeing and/or degrading particularly the beany and astringent constituents, and washing them away along with also freed lipids, saponins, isoflavones, sterol-glycosides, etc., that apparently strongly resist solubilization or similar liberation during the conventional hexanes extraction.

A more specific object is the provision of a proteolytic enzyme treatment for destroying or removing objectionable flavor principles normally present in soybean protein whereby the enzyme-modified protein retains at most only traces of the beany flavors without appreciably degrading the otherwise essentially intact soybean protein, which, because of its thusly produced bland flavor and flavor stability can be substituted for the relatively expensive sodium caseinate in synthetic milk, vanilla ice cream, and in other completely bland foods.

In accordance with the above objects of the invention we have now discovered that the desired flavor improvements of defatted soybean flour or curd are obtained by subjecting the defatted soybean protein material in an aqueous medium to from 2 to 6 hours of selective hydrolysis by a protease member of the group consisting of aspergillopeptidase-A produced by *Aspergillus saitoi*, a mixture of the said aspergillopeptidase-A and crude Takadiastase-SS obtained from cultures of *Aspergillus oryzae*, or carboxypeptidase-A isolated from bovine pancrease, and then removing any thereby released adverse flavor principles by washing therefrom with 50 percent aqueous ethanol.

The unobviousness of the invention is clearly established by Table II which shows that corresponding treatments of soybean protein with the listed proteolytic enzymes or combinations were either incapable of removing both the astringent and beany tastes, or they produced an undesirable color or a different, e.g., salty taste.

TABLE II

| Protease | Treated hydrolysate fraction |
| --- | --- |
| "Coronase" (crude powder from Rhizopus WR-35). | Bitter. |
| "Rapidase" (crude powder from *Trametes sanguinea*). | Bitter but free of astringent taste in 6 hours. |
| "Pronase" (cryst. powder from *Strep. griseus*). | Bitter and astringent (beany) taste. |
| "Bioprase" (cryst. powder from *Bacillus subtilis*). | Do. |
| Bromelin | Do. |
| Takadiastase-SS | Bitterness remained. |
| Mixture of Takadiastase-SS and "Rapidase." | Bland taste but brown discoloration. |
| "Thermoase" | Bitterness remained. |
| Mixture of aspergillopeptidase-A and "Thermoase." | Salty taste. |

The soybean curd substrate used per se in the examples and previously after peptic digestion as the substrate of our earlier bitter peptide discoveries, was prepared by soaking 100-g. portions of soybean in 300 ml. water for 12 hours at room temperature, crushing the wet beans to a paste, adding 200 ml. water, boiling for 30 min., filtering, and adding to the filtrate 3 g. $MgCl_2$ whereby was precipitated 30 g. of wet soy curd. Compositional analysis of the curd was: 88.7 percent water; 1.04 percent N; 0.32 percent crude fat; 3.70 percent carbohydrate; and 0.61 percent ash.

Likewise, defatted soybean flour substrate was prepared by pulverizing hexane-extracted soy meal to a flour. The flour analyzed 9.0 percent water, 8.0 percent nitrogen, 0.7 percent crude fat, 31.6 percent carbohydrate, 6.4 percent ash, and 2.3 percent crude fiber.

EXAMPLE 1

Ten g. (dry basis) of the above soybean curd suspended in 1,000 ml. of dilute HCl (pH 2.8) was digested for 2 hours at 50° C. with 0.1 g. of commercially obtained aspergillopeptidase-A, produced by *Aspergillus saitoi*. The enzymatic digestion was then stopped by neutralizing with NaOH, and the precipitate obtained by filtration or centrifugation was treated with a 10-fold weight of 50 percent ethanol to remove the liberated beany and astringent factors; the wash liquid was removed by filtration, and the treated curd was lyophilized. Compared with identically treated soybean curd, excepting for the addition of the enzyme, the product was found to be free of odor and almost completely free of beany and astringent flavor (completely free thereof when the enzymatic digestion was extended to 4 hours). Furthermore, the presence in an ether extract of the supernatant from the above neutralization step of greatly increased percentages compared with an untreated control extract, of phospholipids, phosphatides, n-hexanol, genistein, ninhydrin positive substances, and carbonyl compounds, e.g., n-hexanal, confirms the specific enzymatic liberation of apparently implicated adverse flavor and autooxidation instability components present in the untreated soybean curd.

EXAMPLE 2

Twenty g. of the defatted soy flour substrate was treated with 900 ml. of dilute HCl (pH 1.5) for 2 hours at 30° C. The centrifuged supernatant was adjusted to a pH of 2.8 and a volume of 1,000 ml. with dilute NaOH and then incubated for 2 hours at 50° C. with 80 mg. of the same commercial enzyme ("Molsin") used for Example 1. The incubation was terminated by lyophilization, and the so-produced powder was treated with a 10-fold weight of 90-percent ethanol to remove the freed adverse flavor components, lipid materials, and carbonyl compounds. The recovered soy flour was dried at room temperature under reduced pressure. It exhibited the same organoleptic, olfactory, and oxidative stability improvements exhibited by the enzyme-treated soy curd product of Example 1.

It is pointed out that although both "C-Pase A," Sigma Chemical Company's proprietary name for crystalline carboxypeptidase-A from bovine pancreas, and "Nagarse," a lyophilized neutral protease of bacterial origin available from the Nagase Company (Japan), in our preliminary bitter peptide formation studies on pepsin hydrolyzed soybean protein effectively debittered the bitter constituent amino acids and the even more bitter specific arbitrarily designated peptides of Table I including dominant "peptide C-1," which had been chromatographically isolated from the dialysate of an 8-hour peptic hydrolysate of defatted soy flour, incubation of the above enzymes with intact or essentially intact soybean protein produced little if any reduction of the objectionably beany and astringent taste. However, other neutral proteases of bacterial origin, i.e., "Prozyme" from cultures of Streptomyces No. 1033 and "Takadiastase-SS," a crude powder obtained from cultures of *Aspergillus oryzae*, appreciably lessened the beany and astringent flavors of undigested soybean as did (but only in 6 hours) the commercially available "Rapidase," obtained from cultures of *Trametes sanguinea*, but the above enzymes caused the appearance of a slight bitterness. Treatment of soybean material with a combination of carboxypeptidase-A and the protease of *Aspergillus oryzae* first at a distinctly acidic pH and then at a neutral pH provided an almost completely bland product that was only very slightly superior to that produced by treatment with aspergillopeptidase-A alone.

We claim:

1. A process for improving the taste and autooxidation resistance of a soybean member selected from the group consisting of soy curd and defatted soy flour comprising subjecting an acidified aqueous dispersion of a said soybean member to about 2–6 hours of incubation at about 50° C. with about 1 percent (based on the weight of the soybean protein content) of crude aspergillopeptidase-A from *Aspergillus saitoi*, neutralizing the incubated dispersion to terminate the enzymatic action, isolating the essentially intact soy member, and washing the latter with 50 percent aqueous ethanol to remove the liberated objectionable taste and autooxidation components.

References Cited
UNITED STATES PATENTS
3,168,406   2/1965   Moshy ---------------- 99—99

RAYMOND N. JONES, Primary Examiner
W. A. SIMONS, Assistant Examiner

U.S. Cl. X.R.
99—99